United States Patent
Ohara

(10) Patent No.: US 10,462,232 B2
(45) Date of Patent: Oct. 29, 2019

(54) NON-TRANSITORY COMPUTER-READABLE MEDIUM FOR SERVER

(71) Applicant: Brother Kogyo Kabushiki Kaisha, Nagoya-shi, Aichi-ken (JP)

(72) Inventor: Kiyotaka Ohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 290 days.

(21) Appl. No.: 15/444,585

(22) Filed: Feb. 28, 2017

(65) Prior Publication Data
US 2017/0257441 A1    Sep. 7, 2017

(30) Foreign Application Priority Data

Mar. 3, 2016  (JP) ................................ 2016-041504

(51) Int. Cl.
*G06F 15/177*  (2006.01)
*H04L 29/08*  (2006.01)
*H04L 29/12*  (2006.01)

(52) U.S. Cl.
CPC ............ *H04L 67/16* (2013.01); *H04L 61/103* (2013.01); *H04L 61/2038* (2013.01); *H04L 61/256* (2013.01); *H04L 67/141* (2013.01); *H04L 67/142* (2013.01); *H04L 61/2015* (2013.01); *H04L 61/2514* (2013.01); *H04L 61/2517* (2013.01)

(58) Field of Classification Search
CPC ... H04L 67/16; H04L 61/103; H04L 61/2038; H04L 61/256; H04L 67/141; H04L 67/142

USPC ........................................ 709/220, 223, 227
See application file for complete search history.

(56) References Cited

U.S. PATENT DOCUMENTS

| | | | | |
|---|---|---|---|---|
| 2006/0192997 A1* | 8/2006 | Matsumoto | ........... | G06F 3/1204 358/1.15 |
| 2011/0125891 A1 | 5/2011 | Kawai | | |
| 2012/0110066 A1* | 5/2012 | Furuta | .................... | G06F 3/122 709/203 |
| 2012/0254961 A1* | 10/2012 | Kim | ...................... | H04L 12/66 726/7 |

(Continued)

FOREIGN PATENT DOCUMENTS

JP        2010-034853 A      2/2010

*Primary Examiner* — Liang Che A Wang
*Assistant Examiner* — Kaylee J Huang
(74) *Attorney, Agent, or Firm* — Banner & Witcoff, Ltd.

(57) ABSTRACT

A server may receive a first registration request from a communication device, receive a second registration request from a terminal device, determine, by using a first IP address included in the first registration request and a second IP address in the second registration request, whether the communication device and the terminal device are belonging to a same local area network, if the communication device and the terminal device are belonging to the same local area network, send a sending request including a connection information and a specific IP address of the communication device to the terminal device, the sending request being for causing the terminal device to send the connection information to the communication device with the specific IP address as a destination, establish a connection between the server and the communication device by using the connection information, and perform a target service by using the connection.

12 Claims, 8 Drawing Sheets

(56) References Cited

U.S. PATENT DOCUMENTS

2013/0222839 A1* 8/2013 Armstrong ............ G06F 3/1203
　　　　　　　　　　　　　　　　　　　　　　　358/1.14
2013/0332546 A1* 12/2013 Miyazawa .............. H04L 51/28
　　　　　　　　　　　　　　　　　　　　　　　709/206

* cited by examiner (First Embodiment : CaseA)

(First Embodiment : CaseA)

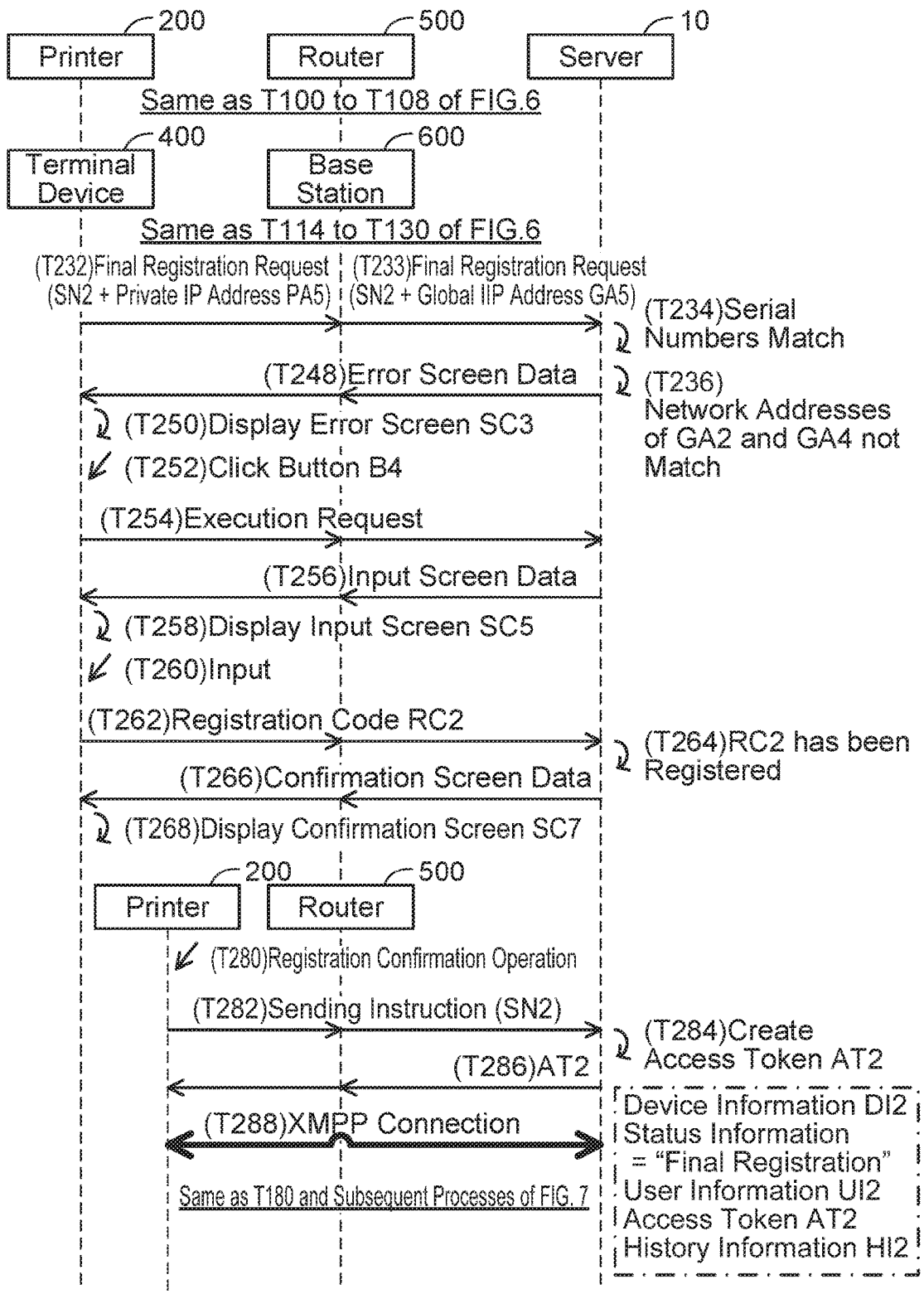

NON-TRANSITORY COMPUTER-READABLE MEDIUM FOR SERVER

TECHNICAL FIELD

The disclosure herein relates to a technique relating to a non-transitory computer-readable medium for realizing a server which is capable of executing a target service related to a communication device.

DESCRIPTION OF RELATED ART

A communication system is known which includes a remote management server on the Internet, an air conditioner, and an adapter for connecting the air conditioner to a LAN (abbreviation of Local Area Network). In a case where the remote management server receives the adapter's MAC address and global IP address from the adapter, the remote management server registers the MAC address and the global IP address in an interim registration database. Thereafter, the remote management server receives a global IP address of a terminal device from the terminal device, and determines, by using the global IP address of the adapter and the global IP address of the terminal device, whether or not the adapter and the terminal device belong to the same LAN. In a case of determining that the adapter and the terminal device belong to the same LAN, the remote management server registers the MAC address of the adapter in a basic information database. Due to this, the remote management server can manage the air conditioner.

SUMMARY

In order for the remote management server to manage the air conditioner, normally, a connection via the Internet needs to be established between the remote management server and the adapter, and the remote management server needs to send information for establishing the connection to the adapter. Here, a router existing between the remote management server and the adapter usually has a function of firewall. In this case, unless the remote management server receives some kind of request from the adapter within the LAN and sends the information in response to the request, the remote management server on the Internet normally cannot send the information to the adapter passing through the firewall of the router.

The disclosure herein provides a technique that sends, to a communication device, connection information for establishing a connection via the Internet between a server and the communication device without the server not receiving a request from the communication device.

A non-transitory computer-readable medium storing computer-readable instructions for a server, the computer-readable instructions, when executed by a processor of the server, may cause the server to execute: receiving a first registration request from a first relay device for relaying a communication via the Internet between a communication device and the server, the first registration request including a first IP address assigned to the communication device and first identification information for identifying the communication device; registering target information including the first IP address and the first identification information in a memory in a case where the first registration request is received; receiving a second registration request from a second relay device for relaying a communication via the Internet between a terminal device different from the communication device and the server after the target information has been registered in the memory, the second registration request including a second IP address assigned to the terminal device and second identification information; determining whether the second identification information included in the second registration request matches the first identification information included in the target information; determining, by using the first IP address included in the target information and the second IP address included in the second registration request, whether the communication device and the terminal device are belonging to a same local area network; in a case where a predetermined condition is true, registering, in association with the target information in the memory, connection information for establishing a connection via the Internet between the server and the communication device, the predetermined condition including a determination that the second identification information matches the first identification information and a determination that the communication device and the terminal device are belonging to the same local area network, wherein in a case where the predetermined condition is not true, the connection information is not registered in the memory; in the case where the predetermined condition is true, sending a sending request including the connection information and a specific IP address assigned to the communication device to the terminal device, the sending request being for causing the terminal device to send the connection information to the communication device with the specific IP address as a destination, wherein in the case where the predetermined condition is not true, the sending request is not sent to the terminal device; establishing the connection via the Internet between the server and the communication device by using the connection information; and performing, by using the connection, a target service which is related to the communication device identified by the first identification information included in the target information.

A server itself that is realized by the non-transitory computer-readable medium, and a control method of the server are also novel and useful.

BRIEF DESCRIPTION OF THE DRAWINGS

FIG. 8 shows a sequence representing a case B where the device information is registered in the server by using a registration code.

EMBODIMENT

Figure 1:
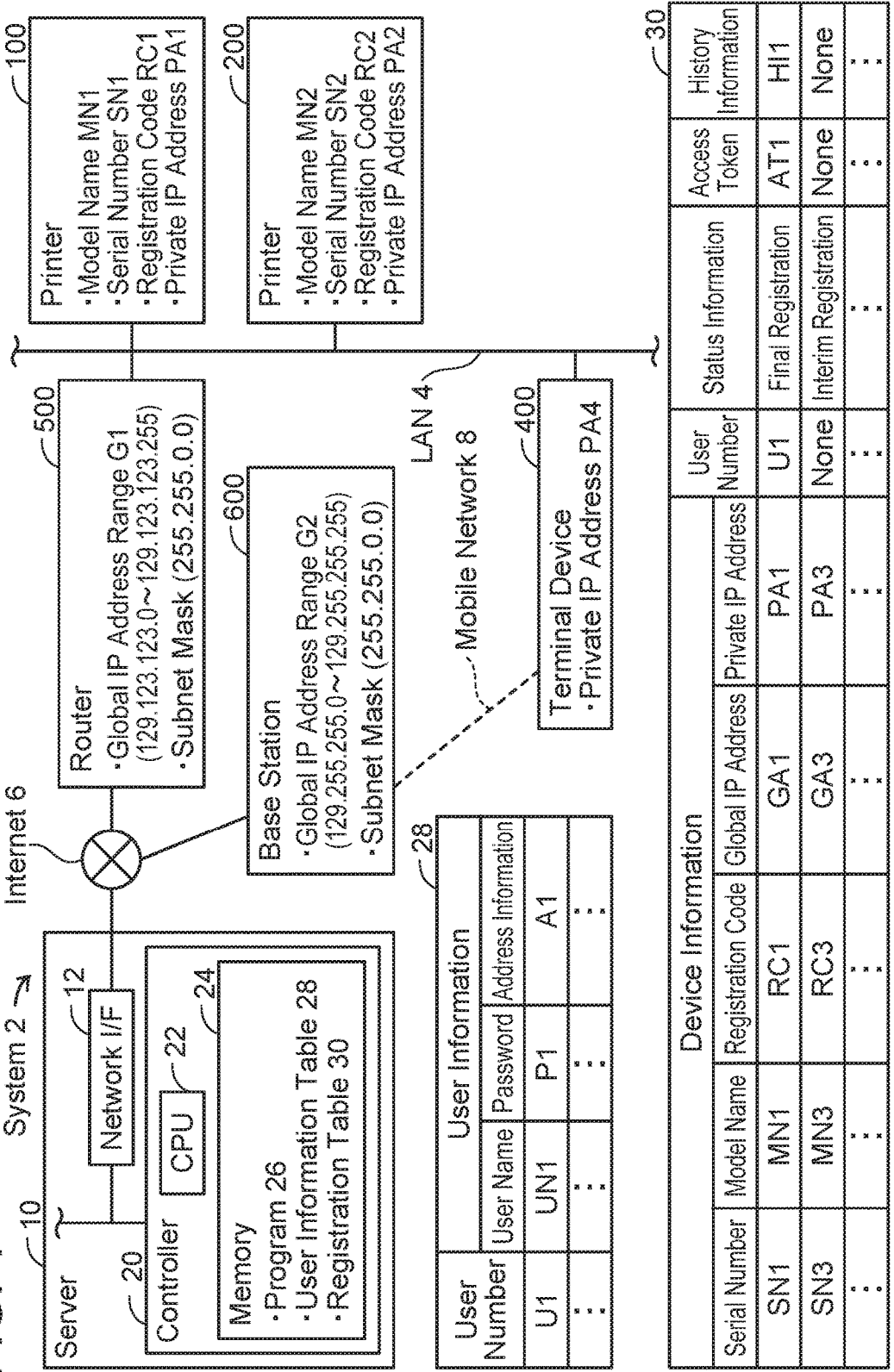
FIG. 1 show a configuration of a communication system and configurations of tables.

First Embodiment (Configuration of a Communication System 2: FIG. 1)
Referring to FIG. 1, a configuration of a communication system 2 will be described. The communication system 2 comprises a server 10, printers 100 and 200, and a terminal device 400. The devices 100, 200, and 400 can communicate with one another via a LAN (abbreviation of Local Area Network) 4. The LAN 4 is connected to the Internet 6 via a router 500. The LAN 4 may be a wired LAN or a wireless LAN. The terminal device 400 can connect to a mobile network 8, and can connect to the Internet 6 via a base station 600 constituting the mobile network 8. The mobile network 8 is a wireless network conforming to a cellular communication system (e.g., 3G (3rd Generation) communication system, 4G (4th Generation) communication system, etc.). Further, the server 10 can communicate with each of the devices 100, 200, and 400 via the Internet 6.

(Configurations of the Printers 100 and 200)

The printer 100 is a peripheral device (i.e., a peripheral device of the terminal device 400) comprising a color printing function. A model name MN1, a serial number SN1, a registration code RC1, and a private IP (abbreviation of Internet Protocol) address PA1 are assigned to the printer 100. When a vender of the printer 100 manufactures plural printers of the same model (i.e., the model name MN1), the vender determines a plurality of character strings including numbers to be given serially as a plurality of serial numbers. Here, each of the serial numbers may further include alphabetical letter(s) and/or mark(s) (e.g., hyphen, etc.). The vender further determines a plurality of character strings to be given randomly as a plurality of registration codes. At this occasion, the vender determines the plurality of registration codes such that the registration codes do not duplicate with one another. Thus, each of the serial numbers and the registration codes is a unique character string. The registration codes are used to register various pieces of information including the serial numbers and the like in the server 10.

The vender assigns the serial number SN1 and the registration code RC1 to the printer 100 among the plural printers. Then, respective pieces of information SN1, MN1, and RC1 are stored in the printer 100 when the printer 100 is manufactured. That is, the respective pieces of the information SN1, MN1, and RC1 are stored in advance in the printer 100 by the time when the printer 100 is shipped. In other words, the respective pieces of the information SN1, MN1, and RC1 are stored in advance in the printer 100 without being inputted by the user of the printer 100 into the printer 100.

Further, a sheet on which the serial number SN1 and the registration code RC1 are described is shipped together with the printer 100. For example, the sheet may be a sticker affixed on a surface of the printer 100, or an operating manual of the printer 100. Thereby, the user of the printer 100 is able to know the serial number SN1 and the registration code RC1 by checking the sheet. Notably, in a variation, in a case where the printer 100 receives a predetermined operation, the printer 100 may print the sheet on which the information SN1 and the information RC1 are described. Further, in another variation, a terminal device (e.g., the terminal device 400) connected to the LAN 4 may request the information SN1 and the information RC1 to the printer 100 in response to a user operation, receive the information SN1 and the information RC1 from the printer 100, and display the received pieces of information. In this variant especially, the printer 100 may function as a web server, and the terminal device may access the web server in the printer 100 by using a browser program and receive the information SN1 and the information RC1 from the printer 100. In both of the variations, the user is able to know the serial number SN1 and the registration code RC1.

The private IP address PA1 is an IP address according to IPv4 (abbreviation of Internet Protocol version 4) for identifying the printer 100 within the LAN 4. The private IP address PA1 may be assigned, for example, by an administrator of the LAN 4 or by an IP address assigning server such as DHCP (abbreviation of Dynamic Host Configuration Protocol) and the like.

The printer 200 is a printer of a model different from the model of the printer 100, and a model name MN2, a serial number SN2, a registration code RC2, and a private IP address PA2 according to IPv4 are assigned to the printer 200 as well.

(Configuration of the Router 500)

The router 500 relays communications between the respective devices 100 and the like within the LAN 4 and the Internet 6 (e.g., the server 10). A global IP address range G1 according to IPv4 which is available to the router 500 (i.e., range from "129.123.123.0" to "129.123.123.255") is assigned to the router 500. Since a subnet mask of the router 500 is "255.255.0.0", a global network address of the LAN 4 is "129.123". In a variation, the subnet mask of the router 500 may be different from "255.255.0.0".

For example, the router 500 assigns a single global IP address included within the range G1 to the printer 100, and associates the global IP address with the private IP address PA1 of the printer 100. Specifically, in a case of receiving a request to be sent from the printer 100 to the server 10, the router 500 stores a target global IP address being the single global IP address within the range G1 and the private IP address PA1 included in a header of the request in association with each other. Due to this, the target global IP address is assigned to the printer 100. Further, the router 500 converts the private IP address included in the header to the target global IP address, and then sends the request to the server 10. Further, when the router 500 receives, from the server 10, a response having the target global IP address included in the header of the request designated as its destination, the router 500 sends a response to the printer 100 with the private IP address PA1 associated with the target global IP address as the destination. This technique can be realized, for example, by NAT (abbreviation of Network Address Translation), NAPT (abbreviation of Network Address and Port Translation), or the like.

(Configuration of the Terminal Device 400)

The terminal device 400 is a portable terminal such as a tablet PC, a smartphone, or the like. When the terminal device 400 is connected to the LAN 4, a private IP address PA4 for identifying the terminal device 400 within the LAN 4 is assigned to the terminal device 400.

(Configuration of the Base Station 600)

The base station 600 relays a communication between the terminal device 400 and the Internet 6 (e.g., the server 10). A global IP address range G2 according to IPv4 which is available to the base station 600 (i.e., range from "129.255.255.0" to "129.255.255.255") is assigned to the base station 600. Since a subnet mask of the base station 600 is "255.255.0.0", a global network address of the mobile network 8 is "129.255" which is different from the global network address of the LAN 4.

(Configuration of the Server 10)

The server 10 is a server for providing a target service (e.g., shipping ink and sending an email to be described later) related to each of the printers 100 and 200 to users of the printers 100, 200 and the like. The server 10 is set up on the Internet 6 by the vender of the printer 100. Notably, in a variation, the server 10 may be set up on the Internet 6 by a business entity different from the vender.

The server 10 comprises a network interface 12 and a controller 20. Each of the network interface 12 and the controller 20 is connected to a bus line (not shown). Notably, the interface will be described as "I/F" below. The controller 20 comprises a CPU 22 and a memory 24. The CPU 22 executes various processes in accordance with a program 26 stored in the memory 24. The memory 24 is constituted of a volatile memory, a non-volatile memory, and the like. The memory 24 stores, other than the program 26, a user information table 28 and a registration table 30. Notably, in a variation, the user information table 28 and the registration table 30 may be stored in an external memory that is communicably connected to the server 10.

(Configuration of the User Information Table 28; FIG. 1)

Referring to FIG. 1, a configuration of the user information table 28 will be described. One or more pieces of user information are registered in the user information table 28. Each of the user information includes a user name (e.g., "UN1") for identifying a corresponding user, a password (e.g., "P1"), and address information (e.g., "A1"). Each of the address information includes an email address and a street address of its corresponding user. Each of the user information is associated with a unique user number for identifying the user information.

(Configuration of the Registration Table 30; FIG. 1)

Referring to FIG. 1, a configuration of the registration table 30 will be described. One or more pieces of device information are registered in the registration table 30. Each of the device information includes a serial number (e.g., "SN1"), a model name (e.g., "MN1"), a registration code (e.g., "RC1"), and a global IP address (e.g., "GA1"). Each of the device information is associated with status information, a user number, an access token, and history information. Notably, in a variation, each of the device information may not include a model name.

Each of the status information indicates a registration state of the associated device information. The registration state indicates an interim registration state or a final registration state. In the interim registration state, the user number, the access token, and the history information are not associated with the device information (e.g., see device information including "SN3"). In the interim registration state, the server 10 does not execute a target service related to a printer identified by the serial number included in the device information. On the other hand, in the final registration state, the user number, the access token, and the history information are associated with the device information (e.g., see device information including "SN1"). As above, in the state where the user number is associated with the device information (i.e., in the final registration state), the device information (e.g., device information including "SN1") and user information identified by the user number (e.g., user information including "UN1") are associated with each other via the user number (e.g., "U1"). In the final registration state, the server 10 executes the target service related to the printer identified by the serial number included in the device information.

The access token is information for establishing various connections via the Internet 6 between the server 10 and the printer. The connections include, for example, an XMPP (abbreviation of Extensible Messaging and Presence Protocol) connection, an HTTPS (abbreviation of Hypertext Transfer Protocol Secure) connection, and the like. Notably, the XMPP connection is a so-called constant connection, which continues to be established until power of the printer 100 is turned off. By using the XMPP connection, the server 10 can send a request to the printer passing through a firewall of the LAN which the printer belongs to (e.g., a firewall formed by the router 500) without receiving a request from the printer. Notably, the mechanism that sends the request from the server 10 to the printer may not be the XMPP connection but be another method.

The history information is information indicating a history of remaining amount information of the printer. The remaining amount information is information indicating remaining amounts of respective colors of ink (e.g., CMYK) in the printer.

Figure 2:
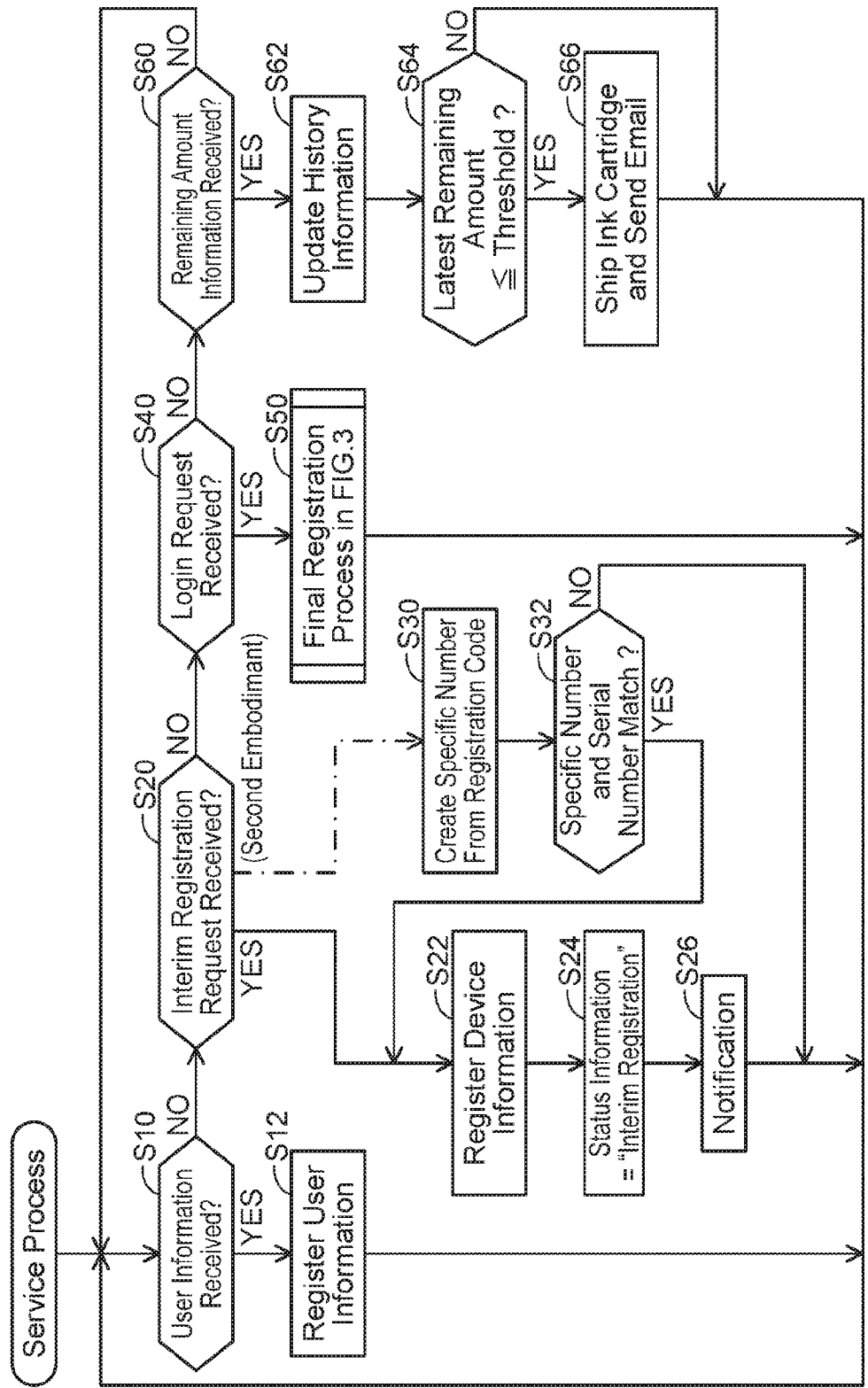
FIG. 2 shows a flowchart of a service process.

(Service Process: FIG. 2)

Referring to FIG. 2, a service process which the CPU 22 of the server 10 executes in accordance with the program 26 will be described. The service process is triggered by the power of the server 10 being turned on. In the service process, each monitoring step S10, S20, S40, and S60 is executed sequentially. Notably, in the following explanation, a communication between the server 10 and the terminal device or the printer will be executed via a relay device (e.g., the router 500, the base station 600) and the Internet 6. However, hereinbelow, indications "via the relay device" and "via the Internet 6" will be omitted unless otherwise mentioned.

In S10, the CPU 22 monitors receiving user information from the terminal device (e.g., the terminal device 400). In a case of receiving the user information together with a request for registering a new user (YES in S10), the CPU 22 proceeds to S12.

In S12, the CPU 22 creates a new user number, and registers the user number and the received user information in association with each other in the user information table 28. When S12 ends, the CPU 22 returns to S10.

In S20, the CPU 22 monitors receiving an interim registration request from the printer (e.g., the printer 200). The interim registration request is a request that includes device information of the printer, and is for registering the device information in the registration table 30. In a case of receiving the interim registration request (YES in S20), the CPU 22 proceeds to S22.

Notably, the printer sends the interim registration request to the server 10 when both conditions of the printer being connected to the Internet 6 via the LAN 4 and the router 500, and electrical power being supplied to the printer are true. That is, the printer sends the interim registration request to the server 10, for example, when the power of the printer is turned on while a LAN cable is connected thereto. Further, the printer sends the interim registration request to the server 10 when the LAN cable is connected to the printer while the power of the printer is turned on. Since the user does not need to perform a particular operation for sending the interim registration request at the printer, workload of the user can be reduced. Notably, in a variation, the printer may send the interim registration request to the server 10 in a case of accepting a predetermined operation performed by the user. Notably, in a variation, the printer may send the interim registration request to the server 10 upon when a setting of a wireless LAN for the printer is completed (i.e., upon when the printer is connected to the wireless LAN) while the power of the printer is turned on.

The printer writes the serial number, the model name, and the registration code onto a body of the interim registration request, and further writes the private IP address of the printer onto the body and a header of the interim registration request, and then sends the interim registration request to the router 500. In this case, in the router 500, the private IP address included in the header of the interim registration request is converted to a global IP address, and the interim registration request is sent to the server 10. Due to this, in the server 10, the interim registration request is received (YES in S20).

In S22, the CPU 22 registers the device information included in the received interim registration request in the registration table 30. Specifically, the CPU 22 identifies the global IP address from the header of the interim registration request, further identifies the serial number, the model name, the registration code, and the private IP address from the body of the interim registration request, and registers these pieces of information in the registration table 30. Notably, in a case where device information that matches the device information included in the received interim registration request has already been registered in the registration table 30, the CPU 22 does not register the received device information in the registration table 30.

In S24, the CPU 22 associates the device information registered in S22 with the status information indicating the interim registration status. In S26, the CPU 22 sends a notification which indicates that the interim registration of the device information has been completed to the printer from which the interim registration request was sent in S20. Due to this, the CPU 22 can have the printer display a screen indicating that the interim registration has been completed. When S26 ends, the CPU 22 returns to S10.

In S40, the CPU 22 monitors receiving a login request from the terminal device (e.g., the terminal device 400). The login request is a request for logging in the server 10. In a case of receiving the login request (YES in S40), the CPU 22 proceeds to S50. In S50, a final registration process (see FIG. 3) is executed. When the final registration process in S50 ends, the CPU 22 returns to S10.

In S60, the CPU 22 monitors receiving the remaining amount information from the printer (e.g., the printer 200). In a case of receiving the remaining amount information (YES in S60), the CPU 22 proceeds to S62. In S62, the CPU 22 updates the history information which is associated with the device information including the serial number of the printer received together with the remaining amount information by adding the remaining amount information to the history information.

Next, in S64, the CPU 22 determines whether or not at least one of remaining amounts of the plural colors of ink included in the latest remaining amount information of the updated history information is equal to or less than a threshold (e.g., 20%). In a case of determining that all of the remaining amounts of the plural colors of ink are larger than the threshold (NO in S64), the CPU 22 skips S66 and returns to S10. Notably, another determination may be executed in S64. For example, the CPU 22 may determine YES in S64 in a case where it is determined that a change in one or more of the ink remaining amounts is equal to or larger than a threshold.

On the other hand, in a case of determining that at least one of the remaining amounts of the plural colors of ink is equal to or less than the threshold (YES in S64), in S66, the CPU 22 executes a process for arranging shipping of the color ink the remaining amount of which is equal to or less than the threshold. Specifically, the CPU 22 firstly identifies, from the registration table 30, the user number associated with the device information including the serial number which was received in S60, and subsequently identifies, from the user information table 28, the address information included in the user information associated with the user number. The CPU 22 further identifies, from the registration table 30, the model name associated with the serial number which was received in S60, and identifies a kind of ink cartridge used in the printer having the identified model name. Then, the CPU 22 executes the process for arranging the shipping of the identified ink cartridge to the street address included in the identified address information. The CPU 22 further sends, to the email address included in the identified address information, an email indicating that the shipping is completed. When S66 ends, the CPU 22 returns to S10.

Figure 3:
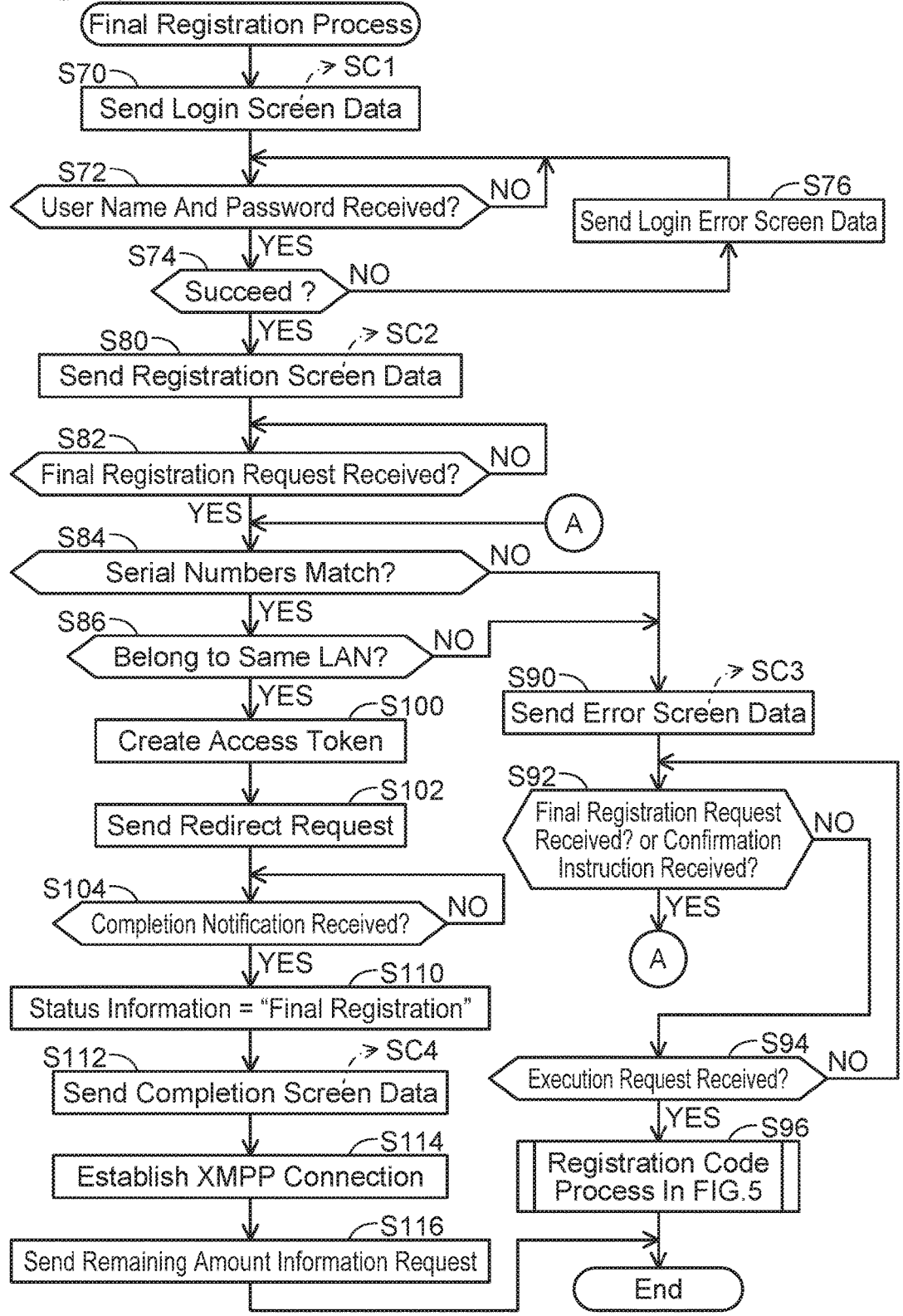
FIG. 3 shows a flowchart of a final registration process.

(Final Registration Process: FIG. 3)

Figure 4:
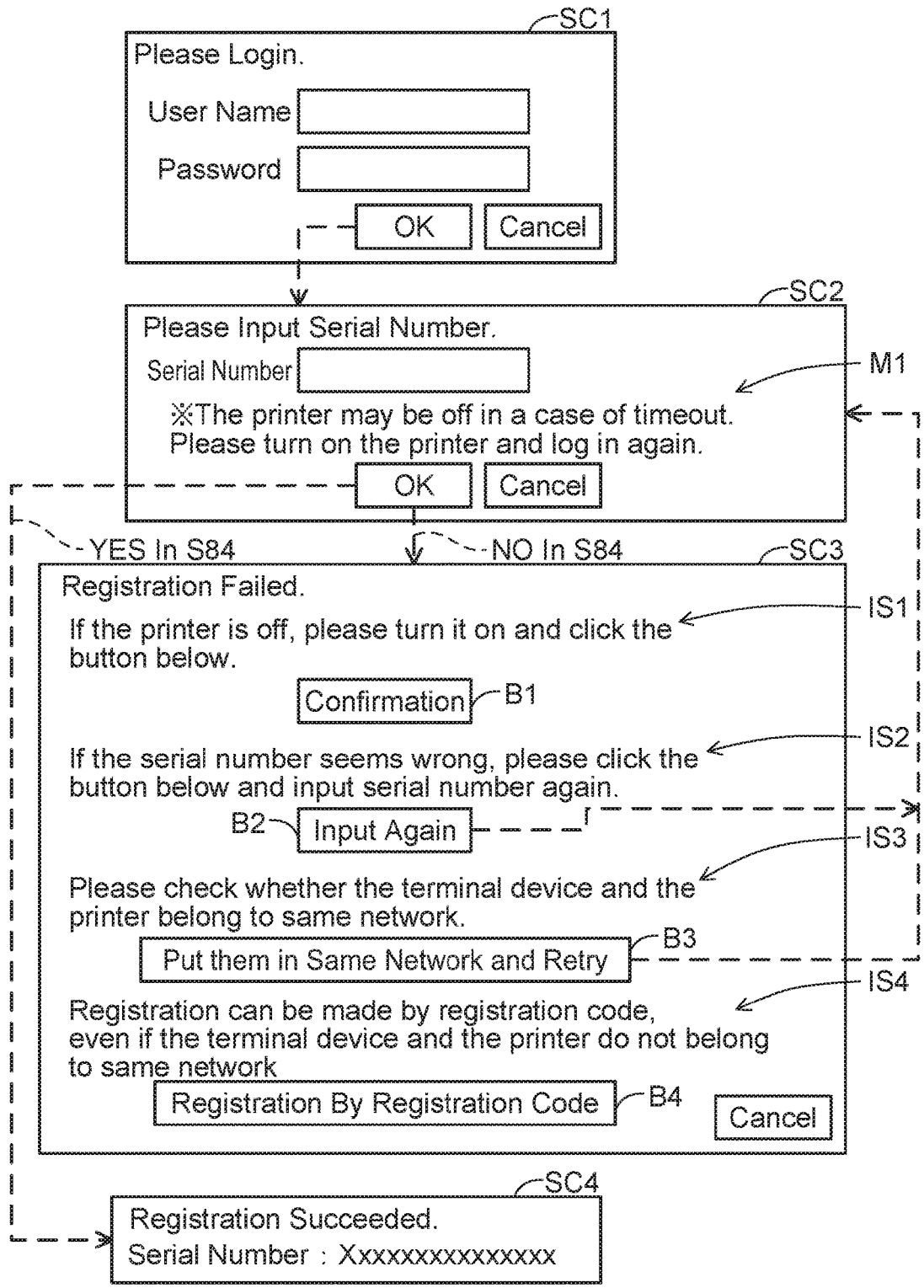
FIG. 4 shows screens displayed in a terminal device.

Referring to FIG. 3, the final registration process executed in S50 of FIG. 2 will be described. In S70, the CPU 22 sends login screen data to the terminal device (e.g., the terminal device 400). Due to this, in the terminal device, a login screen SC1 (see FIG. 4) represented by the login screen data is displayed. The login screen SC1 includes an input field for inputting a user name and a password. In a case of accepting a user operation of selecting (e.g., clicking) an OK button after a user name and a password have been inputted in the input field, the terminal device sends the user name and the password to the server 10.

In S72, the CPU 22 monitors receiving the user name and the password from the terminal device. In a case of receiving the user name and the password (YES in S72), in S74, the CPU 22 executes an authentication of the received user name and password. In a case where a combination of the received user name and password is registered in the user information table 28, the CPU 22 determines that the authentication succeeded (YES in S74) and proceeds to S80.

On the other hand, in a case where the combination is not registered in the user information table 28, the CPU 22 determines that the authentication failed (NO in S 74), and in S76, sends login error screen data to the terminal device. Due to this, a screen represented by the login error screen data (i.e., screen indicating the failure of login) is displayed in the terminal device, and then the login screen SC1 is displayed again. When S76 ends, the CPU 22 returns to S72.

In S80, the CPU 22 sends registration screen data to the terminal device. Due to this, a registration screen SC2 (see FIG. 4) represented by the registration screen data is displayed in the terminal device. The registration screen SC2 includes an input field for inputting a serial number.

In a case of accepting a user operation of selecting an OK button after a serial number has been inputted in the input field, the terminal device writes the serial number (hereinbelow referred to as "target serial number") onto a body of a final registration request, further writes the private IP address of the terminal device onto a header of the final registration request, and sends the final registration request to the server 10. Here, if the terminal device is connected to the LAN 4, in the router 500, the private IP address included in the header of the final registration request is converted to a global IP address, and the final registration request is sent to the server 10. On the other hand, if the terminal device is not connected to the LAN 4, in the base station 600, the private IP address included in the header of the final registration request is converted to a global IP address, and the final registration request is sent to the server 10.

In S82, the CPU 22 monitors receiving the final registration request from the terminal device. In a case of receiving the final registration request (YES in S82), in S84, the CPU 22 determines whether or not a serial number that matches the target serial number included in the final registration request is registered in the registration table 30. In a case of determining that the serial number is registered (YES in S84), the CPU 22 proceeds to S86, while in a case of determining that the serial number is not registered (NO in S84), the CPU 22 proceeds to S90. Notably, in a variation, a combination of the serial number and the model name may be included in the body of the final registration request, and the CPU 22 may determine whether or not a combination that matches the combination of the serial number and the model number is registered in the registration table 30.

In S86, by using the global IP address included in the device information that includes the serial number matching the target serial number (hereinafter referred to as "target device information") and the global IP address included in the header of the final registration request, the CPU 22 determines whether or not the printer identified by the target serial number and the terminal device from which the final registration request was sent belong to a same LAN.

Specifically, the CPU 22 firstly executes a first determination process. In the first determination process, the CPU 22 determines whether or not the global IP address included in the final registration request matches the global IP address included in the target device information. In a case where the two global IP addresses match, the CPU 22 determines that the printer and the terminal device belong to the same LAN (YES in S86), and proceeds to S100. For example, if the global IP address range G1 assigned to the router 500 is narrow, a single global IP address can be assigned to both of a printer and a terminal device which belong to a same LAN. In this situation, the CPU 22 determines that the printer and the terminal device belong to the same LAN (YES in S86), and proceeds to S100.

Further, in a case of determining that the two global IP addresses do not match, the CPU 22 executes a second determination process. In the second determination process, the CPU 22 sends a request including one of the two global IP addresses according to WHOIS protocol, and receives a network address of the one global IP address from a WHOIS server. The WHOIS server is a server which sends information related to the global IP address (e.g., information on an owner of the global IP address, network address of the global IP address, etc.) included in the request. Simultaneously, the CPU 22 also receives a network address of the other one of the two global IP addresses. In a case where the received two network addresses match, the CPU 22 determines that the printer and the terminal device belong to the same LAN (YES in S86), and proceeds to S100. On the other hand, in a case where the received two network addresses do not match, the CPU 22 determines that the printer and the terminal device do not belong to the same LAN (NO in S86), and proceeds to S90. Notably, in a variation, the CPU 22 may send the request to a portal server which is communicable with plural WHOIS servers, and may receive the network addresses. Further, in another variation, the CPU 22 may execute the determination of S86 prior to S84, and in a case of YES in S86, may execute the determination of S84.

In S100, the CPU 22 creates an access token. Notably, in a variation, the access token may be created in advance before the determination of YES in S84 is made, and may be registered in the registration table 30 in association with the target device information.

In S102, the CPU 22 sends a redirect request to the terminal device. The redirect request includes the private IP address included in the target device information (hereinbelow referred to as "target private IP address") and the created access token. The redirect request is a request for causing the terminal device to execute a process for sending the access token to the target private IP address as a destination.

Here, processes that the terminal device and the printer execute in a case where the terminal device receives the redirect request from the server 10 will be described. In the case of receiving the redirect request, the terminal device sends the access token included in the redirect request to the target private IP address included in the redirect request as a destination. In a case of receiving the access token from the terminal device, the printer to which the access token was sent sends a receipt notification including a predetermined URL (abbreviation of Uniform Resource Locator) of the server 10 to the terminal device. The predetermined URL is stored in advance in the printer. The receipt notification is a notification for indicating that the access token has been received. In a case of receiving the receipt notification from the printer, the terminal device sends a completion notification to the server 10 as the destination of the predetermined URL included in the receipt notification. The completion notification is a notification for indicating that the access token has been received in the printer.

Returning to FIG. 3, the rest of the final registration process will be described. In S104, in response to sending the redirect request, the CPU 22 monitors receiving the completion notification from the terminal device. In a case of receiving the completion notification from the terminal device (YES in S104), in S110, the CPU 22 changes the status information which is associated with the target device information in the registration table 30 from the interim registration state to the final registration state. Further, the CPU 22 identifies, from the user information table 28, the user number associated with the user information of which authentication succeeded in S74. Then, the CPU 22 registers the identified user number in association with the target device information in the registration table 30. Due to this, the user information is associated with the target device information. Further, the CPU 22 registers the access token created in S100 in association with the target device information in the registration table 30. Notably, in a variation, the CPU 22 may execute S110 prior to S102, and then may execute S102.

Notably, in a case where a predetermined period of time lapses without receiving the completion notification from the terminal device in S104, the CPU 22 ends the final registration process of FIG. 3. For example, in a case where the power of the printer is off when the redirect request is sent in S102, the printer cannot receive the access token from the terminal device, as a result of which the CPU 22 does not receive the completion notification from the terminal device. In this situation, an operation of turning on the power of the printer and an operation of logging in the server 10 need to be performed by the user. The registration screen SC2 includes a message M1 for encouraging the user to perform these operations.

In S112, the CPU 22 sends completion screen data to the terminal device. Due to this, a completion screen SC4 (see FIG. 4) represented by the completion screen data is displayed at the terminal device. The completion screen SC4 includes a message indicating that the printer has received the access token and the final registration of the printer has been completed.

In S114, the CPU 22 establishes the XMPP connection with the printer. Specifically, in a case of receiving a connection request including an access token from the printer, the CPU 22 determines whether or not the access token is registered in the registration table 30. Then, in a case of determining that the access token is registered, the CPU 22 sends a connection response for the connection request to the printer. As a result, the XMPP connection is established between the server 10 and the printer, which enables the server 10 to send a request to the printer. Notably, in a case of determining that the access token is not registered, the CPU 22 sends an error response for the connection request to the printer. In this case, the XMPP connection is not established.

In S116, the CPU 22 sends a remaining amount information request to the printer by using the XMPP connection established in S114. The remaining amount information request is a command for requesting the printer to periodically send the remaining amount information. Due to this, the server 10 can receive the remaining amount information from the printer (YES in S60 of FIG. 2). When S116 ends, the final registration process ends.

Notably, the CPU 22 can send a remaining amount information request again to the printer after having sent the remaining amount information request to the printer in S116. The remaining amount information request includes interval information indicating a time interval (e.g., 1 day), color information indicating a color of ink (e.g., all colors, or specific color(s)), etc. The printer periodically sends, at the time interval indicated by the interval information (e.g., every day), the remaining amount information indicating remaining amount(s) of the color(s) of ink as indicated by the color information. Here, the interval information and the color information can be changed by an administrator of the server 10. In a case where at least one of the pieces of information is changed after the remaining amount information request has been sent in S116, the CPU 22 sends a remaining amount information request including the changed pieces of information to the printer again by using the XMPP connection established in S114. That is, the server 10 can send, by using the XMPP connection, the remaining amount information request to the printer again without receiving a request from the printer.

Further, in the case of determination of NO in S84 or S86, in S90, the CPU 22 sends error screen data to the terminal device. Due to this, an error screen SC3 (see FIG. 4) represented by the error screen data is displayed at the terminal device. The error screen SC3 includes two instructions IS1 and IS2 respectively corresponding to two causes by which the determination of NO could be made in S84 resulting from an absence of registration of the target serial number in the registration table 30. One of the two causes is that the server 10 has not received the interim registration request including the target serial number from the printer (i.e., S20 to S26 of FIG. 2 have not been executed). The instruction IS1 corresponding to the one of the two causes includes a message for encouraging the user to select a button B1 after turning on the power of the printer. In a case of accepting the user operation of selecting the button B1, the terminal device sends a confirmation instruction to the server 10. The confirmation instruction is an instruction for causing the server 10 to execute the determination of S84 again. Further, the other one of the two causes is that the target serial number is not correct. The instruction IS2 corresponding to the other one of the two causes includes a message for encouraging the user to input the serial number again. In a case of accepting the user operation of selecting a button B2, the terminal device displays the registration screen SC2 again. Due to this, the user can input the serial number again in the registration screen SC2. As a result, a final registration request including the serial number is sent to the server 10 again from the terminal device.

The error screen SC3 further includes an instruction IS3 corresponding to a cause by which the determination of NO could be made in S86 due to the terminal device and the printer not belonging to the same LAN. The instruction IS3 includes a message for encouraging the user to select a button B3 after connecting the terminal device to the LAN where the printer belongs. In a case of accepting the user operation of selecting the button B3, the terminal device displays the registration screen SC2 again. Due to this, the user can input the serial number again to the registration screen SC2. As a result, after the terminal device belongs to the same LAN as the printer, the final registration request including the serial number is sent to the server 10 again from the terminal device.

The error screen SC3 further includes an instruction IS4 for registering the target device information in a final manner by using the registration code, in the case where the terminal device and the printer do not belong to the same LAN and without connecting the terminal device to the same LAN. The instruction IS4 includes a message for encouraging the user to select a button B4 if the user wishes to use the registration code. In a case of accepting the user operation of selecting the button B4, the terminal device sends an execution request to the server 10. The execution request is a request for causing the server 10 to execute a registration code process of FIG. 5.

Next, in S92, the CPU 22 monitors receiving the confirmation instruction from the terminal device in response to the selection of the button B1, and receiving the final registration request from the terminal device in response to the selection of the OK button on the registration screen SC2 which is displayed after the selection of the button B2 or the button B3. In a case of receiving the confirmation instruction or the final registration request (YES in S92), the CPU 22 returns to S84.

Figure 5:
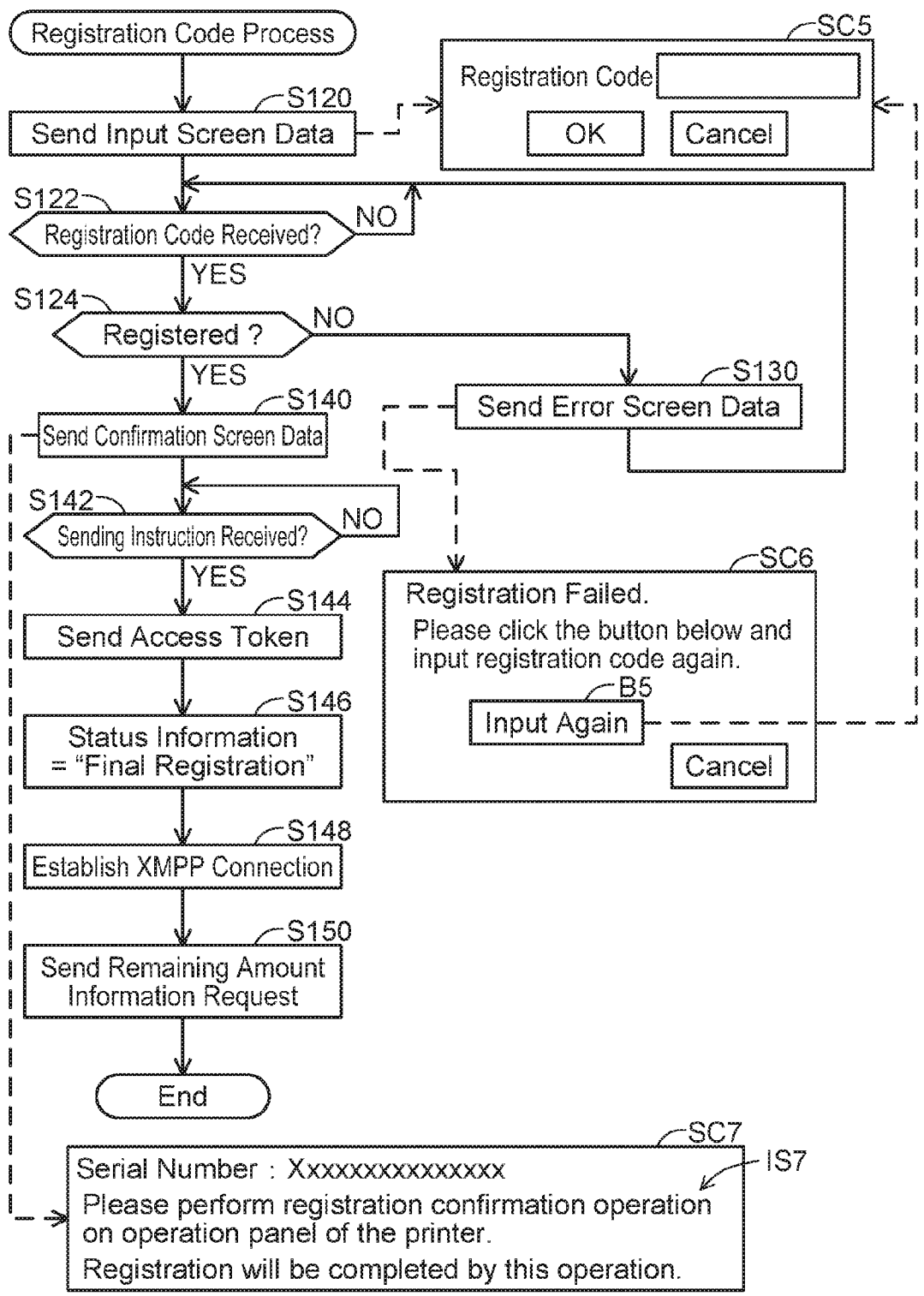
FIG. 5 shows a flowchart of a registration code process.

In a case of receiving the execution request (YES in S94) without receiving the confirmation instruction or the final registration request, in S96, the CPU 22 executes the registration code process (see FIG. 5). When the registration code process of S96 ends, the final registration process ends.

(Registration Code Process: FIG. 5)

Referring to FIG. 5, the registration code process executed in S96 of FIG. 3 will be described. In S120, the CPU 22 sends input screen data to the terminal device. Due to this, an input screen SC5 represented by the input screen data is displayed at the terminal device. The input screen SC5 includes an input field for inputting the registration code. In a case of accepting a user operation of selecting an OK button after the registration code has been inputted to the input field, the terminal device sends the registration code to the server 10.

In S122, the CPU 22 monitors receiving the registration code from the terminal device. In a case of receiving the registration code (YES in S122), in S124, the CPU 22 determines whether or not a registration code that matches the received registration code (hereinafter referred to as "target registration code") is registered in the registration table 30. In a case of determining that the registration code is not registered (NO in S124), the CPU 22 proceeds to S130.

In S130, the CPU 22 sends error screen data to the terminal device and returns to S122. Due to this, an error screen SC6 represented by the error screen data is displayed at the terminal device. The error screen SC6 includes a message for encouraging the user to input the registration code again. In a case of accepting a user operation of selecting a button B5, the terminal device displays the input screen SC5 again. Due to this, the user can input the registration code again to the input screen SC5. As a result, the registration code is sent to the server 10 again from the terminal device. That is, in the case of determining that the registration code is not registered, the CPU 22 sends the error screen data to the terminal device without executing S140 and the subsequent processes to be described later.

On the other hand, in a case of determining that the registration code is registered (YES in S124), in S140, the CPU 22 sends confirmation screen data to the terminal device. Due to this, a confirmation screen SC7 represented by the confirmation screen data is displayed at the terminal device. The confirmation screen SC7 includes an instruction IS7 for encouraging the user to perform a registration confirmation operation on an operation panel of the printer (e.g., the printer 200). The registration confirmation operation is an operation for causing the printer to send a sending instruction to the server 10. The sending instruction is an instruction for causing the server 10 to send an access token.

In S142, the CPU 22 monitors receiving the sending instruction from the printer. In a case of receiving the sending instruction including the serial number of the printer (YES in S142), in S144, the CPU 22 creates an access token and sends the access token to the printer.

In S146, the CPU 22 changes the status information associated with the device information including the serial number included in the sending instruction (i.e., target device information) from the interim registration state to the final registration state in the registration table 30. Further, similarly to in S110 of FIG. 3, the CPU 22 registers, in the registration table 30, the user number and the access token created in S144 in association with the target device information.

S148 and S150 are respectively the same as S114 and S116 of FIG. 3. When S150 ends, the registration code process ends.

Figure 6:
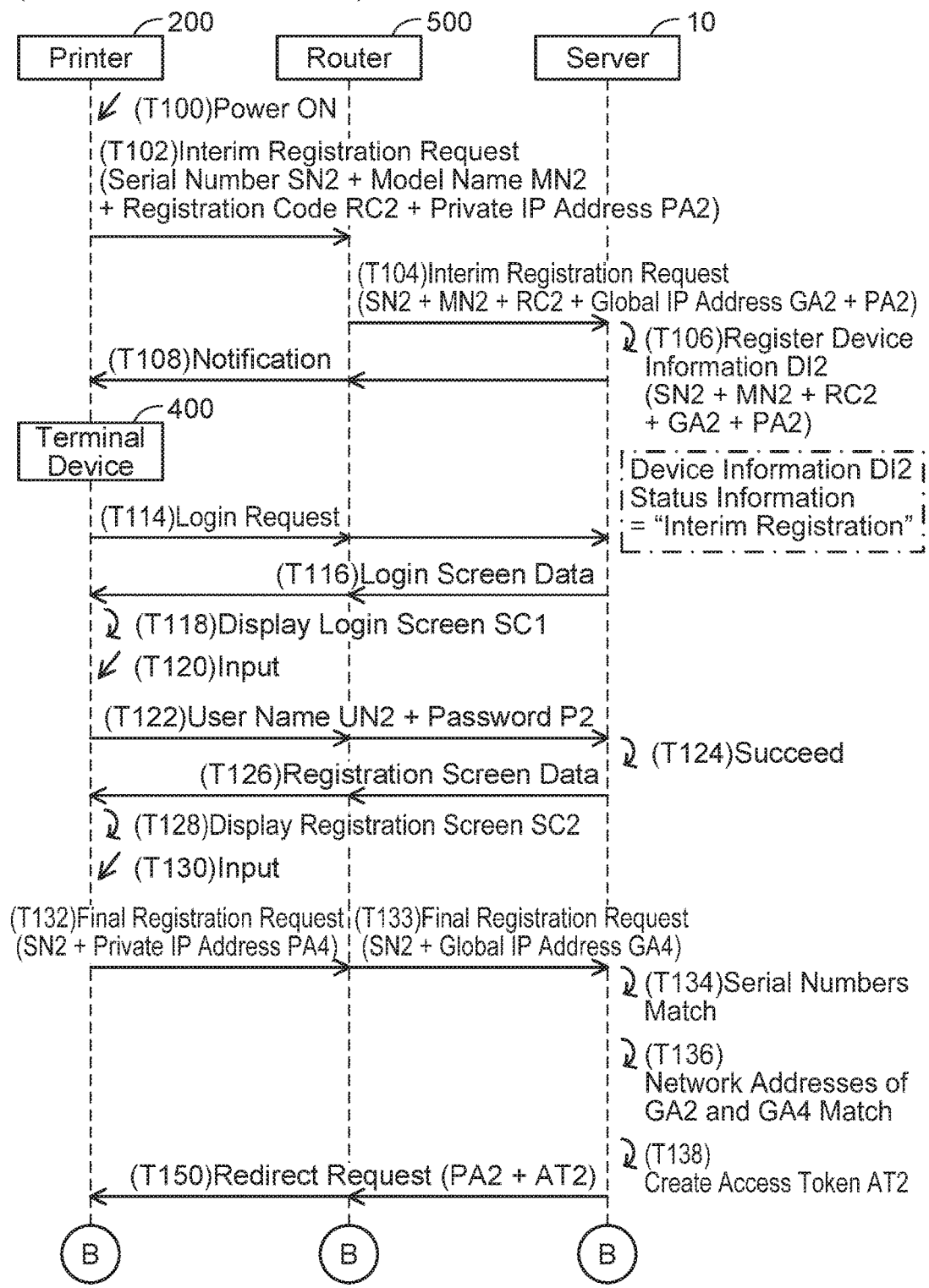
FIG. 6 shows a sequence representing a case A where device information is registered in a server.
Figure 7:
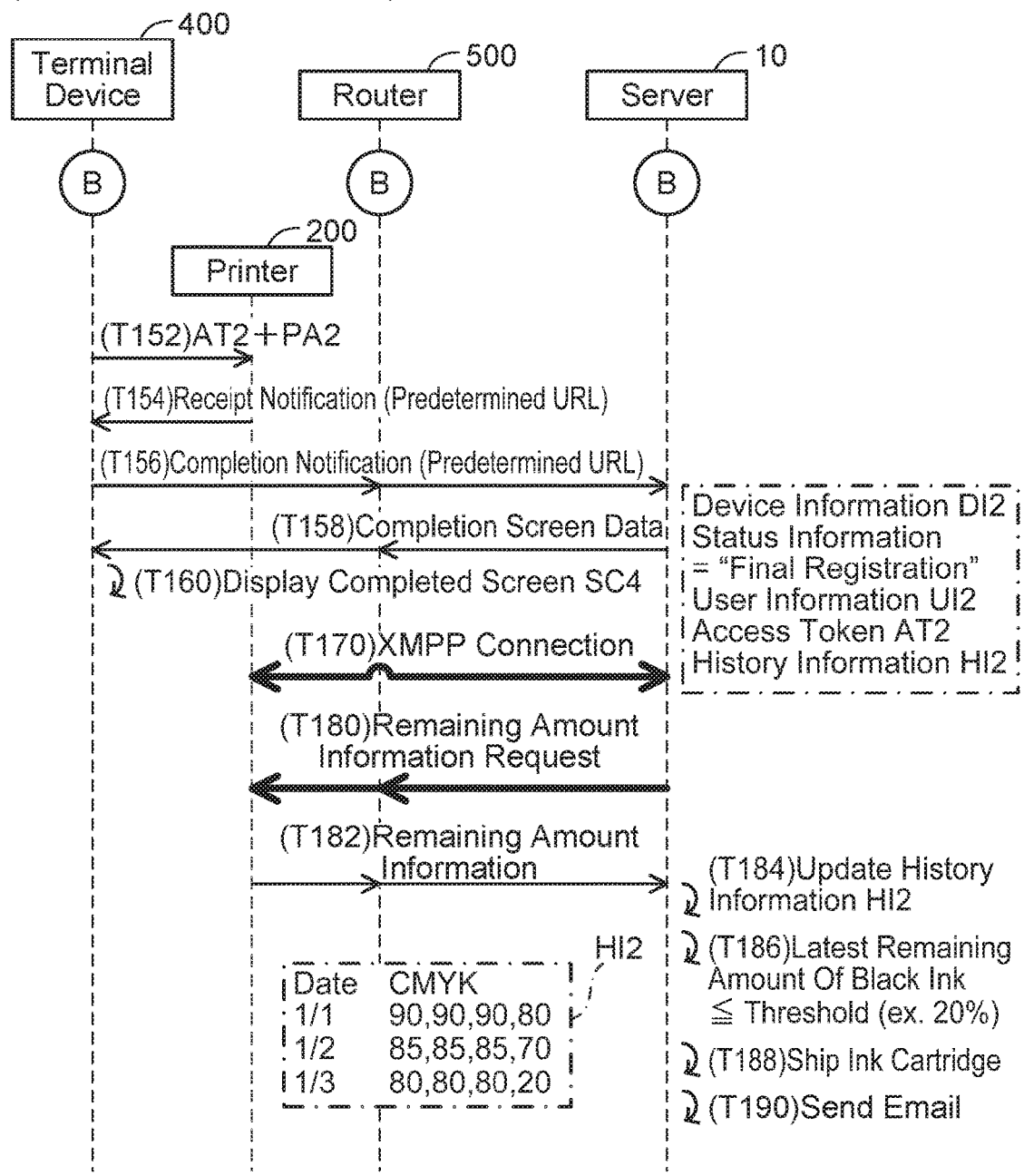
FIG. 7 shows a continuation of the sequence of FIG. 6.

Exemplary Case A: FIGS. 6 and 7

Referring to FIGS. 6 and 7, an exemplary case A realized by the processes of FIGS. 2 and 3 will be described. In an initial state of the present case, the printer 200 is connected to the LAN 4 and has not been turned on even once, since shipped.

In T100, the user turns on the power of the printer 200. In this case, in T102, the printer 200 sends, to the router 500, the interim registration request in the body of which the serial number SN2, the model name MN2, the registration code RC2, and the private IP address PA2 are written and in the header of which the private IP address PA2 is written.

When receiving the interim registration request of T102 from the printer 200, the router 500 stores a global IP address GA2 and the private IP address PA2 included in the header of the interim registration request in association with each other. Further, the router 500 converts the private IP address PA2 included in the header to the global IP address GA2. Then, in T104, the router 500 sends the interim registration request to the server 10.

When receiving the interim registration request of T104 from the router 500 (YES in S20 of FIG. 2), in T106, the server 10 registers, in the registration table 30, device information DI2 including the pieces of information SN2, MN2, RC2, GA2, and PA2 which are included in the interim registration request (S22). At this occasion, the status information indicating the interim registration state is associated with the device information DI2 (S24). In T108, the server 10 sends the notification indicating that the interim registration has been completed to the printer 200 (S26).

The notification of T108 is sent to the printer 200 from the server 10 in response to the interim registration request. That is, the notification includes the global IP address GA2 included in the interim registration request as a destination. In the router 500, the global IP address GA2 is associated with the private IP address PA2 of the printer 200. Due to this, the router 500 can identify the private IP address PA2 from the global IP address GA2 included in the notification, and send the notification to the printer 200 the private IP address PA2 of which is the destination. As above, if the server 10 sends information in response to a request received from a device within the LAN 4 (e.g., the printer 200, the terminal device 400), the server 10 can send the information to the device passing through the firewall of the LAN 4.

In the present case, the terminal device 400 is connected to the LAN 4. Although not shown, if the user wishes to register user information UI2, the server 10 receives, from the terminal device 400, the user information UI2 inputted to the terminal device 400 by the user (YES in S10 of FIG. 2). The user information UI2 includes a user name UN2, a password P2, and address information A2. The server 10 registers the received user information UI2 in the user information table 28 (S12). The process for registering the user information UI2 is executed prior to T114.

If the user wishes a final registration of the printer 200 after the user information UI2 has been registered in the server 10, in T114, the terminal device 400 sends the login request to the server 10 in response to an operation by the user.

When receiving the login request of T114 from the terminal device 400 (YES in S40), in T116, the server 10 sends the login screen data to the terminal device 400 in response to the login request (S70 of FIG. 3).

In T118, the terminal device 400 displays the login screen SC1, and in T120, accepts the user operation of entering the user name UN2 and the password P2. In this case, in T122, the terminal device 400 sends the pieces of information UN2 and P2 to the server 10.

When receiving the pieces of information UN2 and P2 of T122 from the terminal device 400 (YES in S72 of FIG. 3), in T124, the server 10 determines that the authentication has succeeded (YES in S74), and in T126, the server 10 sends the registration screen data to the terminal device 400 in response to the pieces of information UN2 and P2 (S80).

In T128, the terminal device 400 displays the registration screen SC2, and in T130, accepts the user operation of inputting the serial number SN2. In this case, in T132, the terminal device 400 sends, to the router 500, a final registration request in the body of which the serial number SN2 is written and in the header of which the private IP address PA4 is written.

When receiving the final registration request of T132 from the terminal device 400, the router 500 stores a global IP address GA4 different from the global IP address GA2 and the private IP address PA4 included in the header of the final registration request in association with each other. Further, the router 500 converts the private IP address PA4 included in the header to the global IP address GA4. Then, in T133, the router 500 sends the final registration request to the server 10.

When receiving the final registration request of T133 from the router 500 (YES in S82) after the device information DI2 has been registered in the registration table 30 in T106, in T134, the server 10 determines that the serial number that matches the serial number SN2 included in the final registration request is registered in the registration table 30 (YES in S84).

In T136, since the two global IP addresses GA2 and GA4 do not match, the server 10 sends two requests respectively including the global IP addresses GA2 and GA4 to the WHOIS server, and receives two network addresses respectively corresponding to the two global IP addresses GA2 and GA4 from the WHOIS server. Then, the server 10 determines that the received two network addresses match each other (YES in S86).

In T138, the server 10 creates an access token AT2 (S100), and in T150, sends a redirect request including the private IP address PA2 included in the device information DI2 and the access token AT2 to the terminal device 400 in response to the final registration request (S102).

In a case where the redirect request is received by the terminal device 400, the terminal device 400 and the printer 200 execute T152 to T156 of FIG. 7. When receiving the redirect request of T150, in T152, the terminal device 400 sends the access token AT2 to the printer 200 with the private IP address PA2 included in the redirect request as a destination. When receiving the access token AT2 of T152, in T154, the printer 200 sends the receipt notification including a predetermined URL to the terminal device 400. When receiving the receipt notification of T154, in T156, the terminal device 400 sends the completion notification to the server 10 with the predetermined URL as a destination.

When receiving the completion notification of T156, the server 10 changes the status information associated with the device information DI2 from the interim registration status to the final registration status (S110), and further associates the user information UI2 and the access token AT2 with the device information DI2 (S110). Then, in T158, the server 10 sends the completion screen data to the terminal device 400 in response to the completion notification (S112).

In T160, the terminal device 400 displays the completion screen SC4. Due to this, the user is able to know that the final registration of the printer 200 has been completed.

Meanwhile, in T170, the XMPP connection is established between the server 10 and the printer 200 by using the access token AT2 (S114). Notably, in FIG. 7, communications related to the XMPP connection are shown with bold arrows. In T180, the server 10 sends the remaining amount information request to the printer 200 by using the established XMPP connection (S116). Since the server 10 uses the XMPP connection, the server 10 can send the remaining amount information request to the printer 200 passing through the firewall of the LAN 4 even if the remaining amount information request is not a response to a certain request from the printer 200.

When the remaining amount information is to be sent to the server 10 after the remaining amount information request has been received, the printer 200 establishes an HTTPS connection with the server 10 by using the access token AT2. Then, in T182, the printer 200 sends the remaining amount information to the server 10 by using the established HTTPS connection. Once the printer 200 receives the remaining amount information request, in response to which, the printer 200 sends the remaining amount information periodically (e.g., every day) to the server 10.

When receiving the remaining amount information of T182 from the printer 200 (YES in S60 of FIG. 2), in T184, the server 10 updates history information HI2 associated with the device information DI2 by adding the remaining amount information to the history information HI2 (S62). Then, in T186, the server 10 determines that a remaining amount of black ink in the latest remaining amount information is equal to or less than a threshold of 20% (YES in S64). In this case, in T188, the server 10 executes the process for shipping an ink cartridge of the black ink to a street address of the address information A2 included in the user information UI2 which is associated with the device information DI2 (S66). Further, in T190, the server 10 sends an email indicating that the shipping has been completed to an email address of the address information A2 (S66).

(Effects of Case A)

As described above, in the case of receiving the interim registration request from the printer 200 (T104 of FIG. 6), the server 10 registers the device information DI2 in an interim manner in the registration table 30 (T106). Then, in the case of receiving the final registration request from the terminal device 400 (T133), the server 10 determines that the serial number SN2 included in the final registration request and the serial number SN2 in the registration table 30 match (T134), and further determines that the network address of the global IP address GA4 included in the final registration request and the network address of the global IP address GA2 included in the device information DI2 match (T136). In this case, the server 10 sends the redirect request including the private IP address PA2 and the access token AT2 to the terminal device 400 (T150). As a result, the terminal device 400 sends the access token AT2 to the printer 200 with the private IP address PA2 as the destination (T152 of FIG. 7). Since the terminal device 400 and the printer 200 belong to the same LAN 4, the access token AT2 is properly sent to the printer 200.

For example, a comparative example that employs a configuration where the server 10 sends the access token AT2 directly to the printer 200, instead of the configuration where the redirect request including the access token AT2 is sent to the terminal device 400, can be considered. In this case, unless sending the access token AT2 in response to a certain request received from the printer 200, the server 10 cannot send the access token AT2 to the printer 200 passing through the firewall of the LAN 4. Due to this, for example, a configuration where the printer 200 sends the certain request to the server in response to the user performing a certain operation on the printer 200, or a configuration where the printer 200 periodically sends the certain request needs to be employed. The former configuration forces the user to perform the operation, and the latter configuration increases processing load of the printer 200. Contrary to this, according to the present embodiment, the server 10 sends the redirect request in response to the final registration request received from the terminal device 400, and hence the server 10 can send the access token AT2 to the printer 200 via the terminal device 400 without receiving the certain request from the printer 200. Due to this, compared to the configuration of the comparative example, the server 10 can properly send the access token AT2 to the printer 200 without forcing the user to perform the operation and without increasing the processing load of the printer 200.

Further, since the server 10 sends the access token AT2 to the printer 200 (T150) and registers the access token AT2 in association with the device information DI2, the server 10 can establish the XMPP connection with the printer 200 by using the access token AT2 (T170). Due to this, the server 10 can send the remaining amount information request to the printer 200 by using the XMPP connection, as a result of which the server 10 can properly receive the remaining amount information from the printer 200.

Further, for example, a comparative example can be considered where the device information DI2 is registered in the final manner in the server 10 without the determination whether or not the printer 200 and the terminal device 400 belong to the same LAN 4 being made. That is, in this comparative example, T138 and the subsequent processes are executed without executing T136. In this case, in a case where the final registration request is received from a terminal device that belongs to a LAN different from the LAN 4, the device information DI2 can be registered in the final manner in the server 10. There is a possibility that the terminal device that does not belong to the LAN 4 is operated by a third party different from the valid user of the printer. In the present embodiment, in the case where the final registration request is received from the terminal device that does not belong to the LAN 4, the device information DI2 is not registered in the final manner in the server 10. Due to this, the final registration of the device information DI2 can be prevented from being performed by the third party.

Exemplary Case B

Referring to FIG. 8, an exemplary case B realized by the processes of FIGS. 2, 3, and 5 will be described. An initial state of the printer 200 in the present case is the same as the case A of FIG. 6. In the present case, the terminal device 400 is not connected to the LAN 4, and is connected to the mobile network 8. Between the printer 200 and the server 10, the processes same as T100 to T108 of FIG. 6 are executed. Afterwards, between the terminal device 400 and the server 10, the processes same as T114 to T130 of FIG. 6 are executed via the mobile network 8 and the base station 600, not via the LAN 4 and the router 500.

In T232, the terminal device 400 sends, to the base station 600, a final registration request in the body of which the serial number SN2 is written and in the header of which a private IP address PA5 for identifying the terminal device 400 within the mobile network 8 is written.

When receiving the final registration request of T232 from the terminal device 400, the base station 600 stores a global IP address GA5 and the private IP address PA5 included in the header of the final registration request in association with each other. Further, the base station 600 converts the private IP address PA5 included in the header to the global IP address GA5. Then, in T233, the base station 600 sends the final registration request to the server 10.

When receiving the final registration request of T233 from the base station 600 (YES in S82), in T234, the server 10 determines that the serial number that matches the serial number SN2 included in the body of the final registration request is registered in the registration table 30 (YES in S84), and in T236, the server 10 determines that a network address of the global IP address GA5 included in the header of the final registration request and the network address of the global IP address GA2 included in the device information DI2 which includes the serial number SN2 do not match (NO in S86). In this case, in T248, the server 10 sends the error screen data to the terminal device 400 in response to the final registration request (S90).

In T250, the terminal device 400 displays the error screen SC3. In this case, the user sees the instruction IS4 (see FIG. 4) on the error screen SC3, and selects the registration by the registration code. That is, in T252, the user clicks the button B4 on the error screen SC3. As a result, in T254, the terminal device 400 sends the execution request to the server 10.

When receiving the execution request of T254 (YES in S94), in T256, the server 10 sends the input screen data to the terminal device 400 (S120 of FIG. 5).

In T258, the terminal device 400 displays the input screen SC5, and in T260, accepts the user operation of inputting the registration code RC2. In this case, in T262, the terminal device 400 sends the registration code RC2 to the server 10.

When receiving the registration code RC2 of T262 (YES in S122), in T264, the server 10 determines that the registration code which matches the received registration code RC2 is registered in the registration table 30 (YES in S124). In this case, in T266, the server 10 sends the confirmation screen data to the terminal device 400.

In T268, the terminal device 400 displays the confirmation screen SC7. Due to this, the user is able to know that the registration confirmation operation should be performed on the printer 200.

In T280, the printer 200 accepts the registration confirmation operation from the user. In this case, in T282, the printer 200 sends the sending instruction including the serial number SN2 to the server 10.

When receiving the sending instruction of T282 from the printer 200 (YES in S142), in T284, the server 10 creates the access token AT2, and in T286, sends the access token AT2 to the printer 200 in response to the sending instruction (S144). Due to this, the server 10 can send the access token AT2 to the printer 200 passing through the firewall of the LAN 4 without using the XMPP connection. As a result, in T288, the XMPP connection is established between the server 10 and the printer 200 (S148).

When sending the access token AT2 to the printer 200, the server 10 changes the status information associated with the device information DI2 from the interim registration state to the final registration state (S146), and further associates the user information UI2 and the access token AT2 with the device information DI2 (S146). Afterwards, the processes same as T180 and the subsequent processes of FIG. 7 are executed.

(Effects of Case B)

As shown in the case B, in the case where the terminal device 400 and the printer 200 do not belong to the same LAN 4, the access token AT2 is not registered in the server 10, and the redirect request including the access token AT2 is not sent to the terminal device 400. This is because even if the redirect request is sent to the terminal device 400, the terminal device 400 cannot send the access token AT2 to the printer 200 since the terminal device 400 and the printer 200 do not belong to the same LAN 4. Therefore, the server 10 sends the error screen data to the terminal device 400 (T248). Due to this, the terminal device 400 displays the error screen SC3 including the instruction IS4 for causing the server 10 to execute the registration code process (T250). The user can instruct the server 10 to execute the registration code process by selecting the button B4. That is, the user can register the device information DI2 in the final manner in the server 10 by using the registration code RC2, without connecting the terminal device 400 to the LAN 4 where the printer 200 belongs. Due to this, user-friendliness can be improved.

The following method can be considered as a comparative example for registering the device information DI2 in the final manner in the server 10 without using the registration code RC2 when the printer 200 and the terminal device 400 do not belong to the same LAN 4. That is, in T260, the serial number SN2 is inputted instead of the registration code RC2, and in T262, the serial number SN2 is sent from the terminal device 400 to the server 10. In this case, the server 10 determines whether or not the serial number SN2 is registered in the registration table 30, and in a case of determining that the serial number SN2 is registered, the server 10 registers the device information DI2 in the final manner. However, as described above, the serial number SN2 includes one of the numbers which are given serially, and hence the serial number SN2 is easily presumed by a third party different from the valid user of the printer. Due to this, the device information DI2 can be registered in the final manner in the server 10 by the third party. Contrary to this, since the registration code RC2 is a randomly-set character string, the registration code RC2 is difficult to be presumed by the third party. Therefore, by using the registration code RC2 as described in the present embodiment, the final registration of the device information DI2 can be prevented from being performed by the third party.

(Correspondence Relationships)

The printer 100 is an example of "communication device". In the case A of FIG. 6, the router 500 is an example of "first relay device" and "second relay device". In the case B of FIG. 8, the router 500 and the base station 600 are respectively examples of "first relay device" and "second relay device". The device information DI2 is an example of "target information". The interim registration request of T102 of FIG. 6, the global IP address GA2, and the serial number SN2 are respectively examples of "first registration request", "first IP address", and "first identification information". The final registration request of T132, the global IP address GA4, and the serial number SN2 are respectively examples of "second registration request", "second IP address", and "second identification information". The access token AT2 is an example of "connection information". At least one of the XMPP connection and the HTTPS connection is an example of "connection". The redirect request of T150 of FIG. 6, the private IP address PA2, and the predetermined URL are respectively examples of "sending request", "specific IP address", and "position information". The shipping of ink of T188 and the sending of the email of T190 are examples of "target service". The remaining amount information request of T180 and the remaining amount information are respectively examples of "information request" and "device related information". The registration code RC2 included in the interim registration request of T104 of FIG. 6 is an example of "first code". The error screen SC3 including the instruction IS4 is an example of "first instruction screen". The registration code RC2 of T262 of FIG. 8 is an example of "second code". The confirmation screen SC7 and the registration confirmation operation of T280 are respectively examples of "second instruction screen" and "predetermined operation".

Second Embodiment

In the present embodiment, a registration code assigned to a printer is created from a serial number of the printer. Specifically, when manufacturing the printer, a vender of the printer creates the registration code by encrypting the serial number of the printer according to a predetermined key used in a common key cryptosystem. The common key cryptosystem is a system, such as AES (abbreviation of Advanced Encryption Standard), in which encryption and decryption are executed by a same key. Notably, in a variation, the registration code may be created by encrypting the serial number according to a predetermined key used in a public key cryptosystem. The public key cryptosystem is a system in which encryption and decryption are executed by different keys.

(Service Process: FIG. 2)

In the present embodiment, the process in the case of YES in S20 of FIG. 2 is different from that of the first embodiment. In the case of YES in S20, the CPU 22 proceeds to S30.

In S30, the CPU 22 creates a specific number by decrypting the registration code included in the interim registration request by using a predetermined key. Then, in S32, the CPU 22 determines whether or not the specific number and the serial number included in the interim registration request match. In a case of determining that the specific number and the serial number match (YES in S32), the CPU 22 proceeds to S22, whereas in a case of determining that the specific number and the serial number do not match (NO in S32), the CPU 22 skips S22 through S26 and returns to S10.

As mentioned above, the serial number is easily presumed by a third party. Thus, the third party can unrighteously access the server 10, and register a presumed serial number of an actual printer and an unauthorized registration code in the interim manner in the server 10. Contrary to this, in the present embodiment, in the case where the specific number decrypted from the registration code included in the interim registration request and the serial number included in the interim registration request do not match, the device information is not registered in the interim manner in the registration table 30 (NO in S32 of FIG. 2). Due to this, the unrighteous registration of the device information in the server 10 by the third party can be prevented.

(Variation 1)

Generally, global IP addresses according to IPv4 having 4 bytes of information quantity are classified into 5 ranges from class A to class E, and network addresses having different information quantity ranges are defined in the respective 5 ranges. For example, a range of a global IP address classified in the class B is "128.0.0.0" to "191.255.255.255", and a network address of the class B is defined as first and second octets thereof. In S86 of FIG. 3, the CPU 22 may determine, by using the class, whether or not the terminal device and the printer belong to the same LAN. Specifically, the CPU 22 firstly identifies the class (e.g., the class B) of the global IP address (e.g., "129.123.123.0") included in the target device information. Then, by using the identified class, the CPU 22 identifies the network address (e.g., "129.123") of the global IP address. Similarly, the CPU 22 identifies the class and the network address of the global IP address included in the final registration request. Then, in a case where the two identified network addresses match, the CPU 22 determines that the terminal device and the printer belong to the same LAN, whereas in a case where the two network addresses do not match, the CPU 22 determines that the terminal device and the printer do not belong to the same LAN. Notably, the CPU 22 may determine whether or not the terminal device and the printer belong to the same LAN by combining the determination of S86 in the embodiment and the determination in the present variation. Further, any one of the determinations may be a determination to be executed first.

(Variation 2)

A global IP address according to IPv6 (abbreviation of Internet Protocol version 6) may be assigned to each of the printer 100, the printer 200, and the terminal device 400. In this case, the interim registration request of S20 of FIG. 2 does not include a private IP address of one of the printers 100 and 200, and in S22, the CPU 22 registers device information that does not include the private IP address of the printer in the registration table 30. Then, in S102 of FIG. 3, the CPU 22 sends, to the terminal device, a redirect request including a global IP address of the printer registered in the registration table 30. In the present variation, the global IP address of the printer is an example of "specific IP address".

(Variation 3)

The device information may not be registered in association with the status information in the registration table 30. For example, the memory 24 may comprise an interim registration area and a final registration area. Further, the CPU 22 may register the device information in the interim manner by storing the device information in the interim registration area, and may register the device information in the final manner by storing the device information in the final registration area.

(Variation 4)

The information received in S60 of FIG. 2 may not be limited to the remaining amount information. For example, the CPU 22 may receive frequency information indicating a number of times of printing in the printer. In this case, the CPU 22 may send the frequency information by email. In the present variation, the frequency information and the sending of the frequency information by email are respectively examples of "device related information" and "target service".

(Variation 5)

The user information table 28 may not be provided. For example, the server 10 may be a server executing a service that translates text in a print target file into a predetermined language. In this case, after having permanently registered the device information, the CPU 22 receives a translation request including a serial number and the print target file from the terminal device, and translates the text in the print target file. Next, the CPU 22 identifies the device information from the serial number included in the translation request, and identifies a printing capability of the printer indicated by the model name included in the identified device information. Afterwards, based on the identified printing capability, the CPU 22 converts the translated file to print data and sends the print data to the printer. In the present variation, the creation and sending of the translated file is an example of "target service". Notably, in another variation, instead of the above-mentioned translation, a predetermined image processing (e.g., correction of white balance, conversion from a color image to a monochrome image, etc.) may be executed to the print target file.

(Variation 6)

After having executed S102 of FIG. 3, the CPU 22 may execute S110, S114, and S116, without executing S104 to S112.

(Variation 7)

The CPU 22 may not execute S94 and S96 of FIG. 3.

(Variation 8)

In S102 of FIG. 3, the CPU 22 may send a redirect request including an identifier used in HTTP (abbreviation of Hyper Text Transfer Protocol) Cookie to the terminal device, instead of sending the access token. In this case, the CPU 22 ends the final registration process of FIG. 3 without executing S114 and S116. Further, in S60 of FIG. 2, in response to receiving the identifier from the printer, the CPU 22 may establish an HTTP connection with the printer and receive the remaining amount information via the connection. In another variation, in S102, the CPU 22 may send a redirect request including a specific URL to the terminal device, and end the final registration process of FIG. 3 without executing S114 and S116. Further, in S60, in response to receiving, from the printer, the connection request with the URL as a destination, the CPU 22 may establish the HTTP connection with the printer, and receive the remaining amount information via the connection. In the present variation, the identifier or the specific URL is an example of "connection information".

(Variation 9)

Instead of S30 of FIG. 2 in the second embodiment, the CPU 22 may create a specific code by encrypting the serial number included in the interim registration request by using a predetermined key. In this case, in S32, the CPU 22 may determine whether or not the created specific code and the registration code included in the interim registration request.

(Variation 10)

"Communication device" may not be limited to a printer, and may be a scanner, a multifunction device, a facsimile machine, or the like. For example, in a case where the "communication device" is a scanner, the server 10 receives frequency information indicating a number of times of scan from the scanner and sends the frequency information by email, which is an example of "target service".

What is claimed is:

1. A non-transitory computer-readable medium storing computer-readable instructions for a server, the computer-readable instructions, when executed by a processor of the server, causing the server to execute:

receiving a first registration request from a first relay device for relaying a communication via the Internet between a communication device and the server, the first registration request including a first IP address assigned to the communication device and first identification information for identifying the communication device;

registering target information including the first IP address and the first identification information in a memory in a case where the first registration request is received;

receiving a second registration request from a second relay device for relaying a communication via the Internet between a terminal device different from the communication device and the server after the target information has been registered in the memory, the second registration request including a second IP address assigned to the terminal device and second identification information;

determining whether the second identification information included in the second registration request matches the first identification information included in the target information;

determining, by using the first IP address included in the target information and the second IP address included in the second registration request, whether the communication device and the terminal device are belonging to a same local area network; in a case where a predetermined condition is true, registering, in association with the target information in the memory, connection information for establishing a connection via the Internet between the server and the communication device, the predetermined condition including a determination that the second identification information matches the first identification information and a determination that the communication device and the terminal device are belonging to the same local area network, wherein in a case where the predetermined condition is not true, the connection information is not registered in the memory;

in the case where the predetermined condition is true, sending a sending request including the connection information and a specific IP address assigned to the communication device to the terminal device, the sending request being for causing the terminal device to send the connection information to the communication device with the specific IP address as a destination, wherein in the case where the predetermined condition is not true, the sending request is not sent to the terminal device;

receiving the connection information from the communication device after the terminal device has sent the connection information to the communication device in accordance with the sending request;

establishing the connection via the Internet between the server and the communication device by using the connection information received from the communication device; and performing, by using the connection, a target service which is related to the communication device identified by the first identification information included in the target information.

2. The non-transitory computer-readable medium as in claim 1, wherein in a case where the first identification information is received by the first relay device from the communication device, the first registration request is received from the first relay device.

3. The non-transitory computer-readable medium as in claim 1, wherein the first registration request is received from the first relay device when both conditions of the communication device being connected to the Internet and electrical power being supplied to the communication device are true.

4. The non-transitory computer-readable medium as in claim 1, wherein the computer-readable instructions, when executed by the processor, cause the server to further execute:

receiving user information which is related to a user via the Internet from the terminal device; and registering the received user information in the memory, wherein the target information is registered in the memory in a first state where the user information is not associated with the target information, after the target information has been registered in the memory in the first state where the user information is not associated with the target information, the connection information is registered in the memory in a second state where the user information is associated with the target information and the connection information, and the target service is performed by using the user information.

5. The non-transitory computer-readable medium as in claim 1, wherein in a case where the communication device receives the connection information via the terminal device from the server in response to the terminal device sending the connection information with the specific IP address as the destination, a receipt notification including position information for indicating a position of the server is sent from the communication device to the terminal device, wherein the computer-readable instructions, when executed by the processor, cause the server to further execute:

in a case where a completion notification is received from the terminal device, sending, to the terminal device, completion screen data representing a completion screen which indicates that the communication device has received the connection information, the completion notification being sent from the terminal device to the server by using the position information included in the receipt notification in a case where the terminal device receives the receipt notification.

6. The non-transitory computer-readable medium as in claim 1, wherein the first registration request further includes a first code that has been stored in advance in the communication device without being inputted to the communication device by a user of the communication device, wherein the computer-readable instructions, when executed by the processor, cause the server to further execute:

in a case where it is determined that the communication device and the terminal device are not belonging to the same local area network, sending, to the terminal device, first instruction screen data representing a first instruction screen for encouraging a user to input a code into the terminal device;

in a case where a second code is inputted by the user into the terminal device in response to sending the first instruction screen data, receiving the second code from the terminal device via the Internet;

determining whether the second code matches the first code in a case where the second code is received;

in a case where it is determined that the second code matches the first code, registering the connection information in association with the target information in the memory, wherein in a case where it is determined that the second code does not match the first code, the connection information is not registered in the memory;

in a case where it is determined that the second code matches the first code, sending, to the terminal device, second instruction screen data representing a second instruction screen for encouraging the user to perform a predetermined operation on the communication device, the predetermined operation being for causing the communication device to send a connection request to the server, wherein in a case where it is determined that the second code does not match the first code, the second instruction screen data is not sent to the terminal device; and sending the connection information to the communication device in a case where the connection request is received from the communication device.

7. The non-transitory computer-readable medium as in claim 6, wherein the first identification information includes one of numbers, each of the numbers being given serially to a corresponding one of plural devices including the communication device, and the first code includes one of character strings, each of the character strings being given randomly to a corresponding one of the plural devices.

8. The non-transitory computer-readable medium as in claim 6, wherein the computer-readable instructions, when executed by the processor, cause the server to further execute:

in a case where the first registration request is received, determining, by using the first identification information and the first code, whether the first code is a code which has been created from the first identification information, wherein in a case where it is determined the first code is the code which has been created from the first identification information, the target information is registered, and in a case where it is determined the first code is not the code which has been created from the first identification information, the target information is not registered.

9. The non-transitory computer-readable medium as in claim 1, wherein
the target service includes:
sending, to the communication device, an information request for requesting device related information which is related to the communication device; and
receiving the device related information from the communication device in response to sending the information request.

10. The non-transitory computer-readable medium as in claim 1, wherein
the first IP address is a global IP address according to IPv4 assigned to the communication device,
the first registration request further includes the specific IP address which is a private IP address according to IPv4 assigned to the communication device,
the target information further includes the specific IP address, and
the second IP address is a global IP address according to IPv4 assigned to the terminal device.

11. A server comprising:
a processor; and
a memory configured to store computer-readable instructions therein, the computer-readable instructions, when executed by the processor, causing the server to perform:
receiving a first registration request from a first relay device for relaying a communication via the Internet between a communication device and the server, the first registration request including a first IP address assigned to the communication device and first identification information for identifying the communication device;
registering target information including the first IP address and the first identification information in a memory in a case where the first registration request is received;
receiving a second registration request from a second relay device for relaying a communication via the Internet between a terminal device different from the communication device and the server after the target information has been registered in the memory, the second registration request including a second IP address assigned to the terminal device and second identification information;
determining whether the second identification information included in the second registration request matches the first identification information included in the target information;
determining, by using the first IP address included in the target information and the second IP address included in the second registration request, whether the communication device and the terminal device are belonging to a same local area network; in a case where a predetermined condition is true, registering, in association with the target information in the memory, connection information for establishing a connection via the Internet between the server and the communication device, the predetermined condition including a determination that the second identification information matches the first identification information and a determination that the communication device and the terminal device are belonging to the same local area network, wherein in a case where the predetermined condition is not true, the connection information is not registered in the memory;

in the case where the predetermined condition is true, sending a sending request including the connection information and a specific IP address assigned to the communication device to the terminal device, the sending request being for causing the terminal device to send the connection information to the communication device with the specific IP address as a destination, wherein in the case where the predetermined condition is not true, the sending request is not sent to the terminal device;
receiving the connection information from the communication device after the terminal device has sent the connection information to the communication device in accordance with the sending request;
establishing the connection via the Internet between the server and the communication device by using the connection information received from the communication device; and
performing, by using the connection, a target service which is related to the communication device identified by the first identification information included in the target information.

12. A method performed by a server, the method comprising:
receiving a first registration request from a first relay device for relaying a communication via the Internet between a communication device and the server, the first registration request including a first IP address assigned to the communication device and first identification information for identifying the communication device;
registering target information including the first IP address and the first identification information in a memory in a case where the first registration request is received;
receiving a second registration request from a second relay device for relaying a communication via the Internet between a terminal device different from the communication device and the server after the target information has been registered in the memory, the second registration request including a second IP address assigned to the terminal device and second identification information;
determining whether the second identification information included in the second registration request matches the first identification information included in the target information;
determining, by using the first IP address included in the target information and the second IP address included in the second registration request, whether the communication device and the terminal device are belonging to a same local area network; in a case where a predetermined condition is true, registering, in association with the target information in the memory, connection information for establishing a connection via the Internet between the server and the communication device, the predetermined condition including a determination that the second identification information matches the first identification information and a determination that the communication device and the terminal device are belonging to the same local area network, wherein in a case where the predetermined condition is not true, the connection information is not registered in the memory;
in the case where the predetermined condition is true, sending a sending request including the connection information and a specific IP address assigned to the communication device to the terminal device, the sending request being for causing the terminal device to send the connection information to the communication device with the specific IP address as a destination, wherein in the case where the predetermined condition is not true, the sending request is not sent to the terminal device;

receiving the connection information from the communication device after the terminal device has sent the connection information to the communication device in accordance with the sending request;

establishing the connection via the Internet between the server and the communication device by using the connection information received from the communication device; and performing, by using the connection, a target service which is related to the communication device identified by the first identification information included in the target information.

* * * * *